(12) United States Patent
Chae et al.

(10) Patent No.: US 11,745,297 B2
(45) Date of Patent: Sep. 5, 2023

(54) SHAPE CONTROL IN GRIPPING SYSTEMS AND METHODS

(71) Applicant: GM GLOBAL TECHNOLOGY OPERATIONS LLC, Detroit, MI (US)

(72) Inventors: HyungMin Chae, Troy, MI (US); Tyson W. Brown, Royal Oak, MI (US); Mark A. Smith, Huntington Woods, MI (US); Richard J. Skurkis, Lake Orion, MI (US); Wonhee M. Kim, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 452 days.

(21) Appl. No.: 17/103,698

(22) Filed: Nov. 24, 2020

(65) Prior Publication Data

US 2022/0161380 A1 May 26, 2022

(51) Int. Cl.
*B23Q 7/04* (2006.01)
*B25J 9/14* (2006.01)
(Continued)

(52) U.S. Cl.
CPC ............. *B23Q 7/043* (2013.01); *B23Q 7/046* (2013.01); *B25J 9/14* (2013.01); *B25J 9/1612* (2013.01);
(Continued)

(58) Field of Classification Search
CPC ........ B23Q 7/043; B23Q 7/046; B23Q 3/062; B23Q 7/047; B25J 9/14; B25J 9/1612;
(Continued)

(56) References Cited

U.S. PATENT DOCUMENTS 4,294,424 A * 10/1981 Teissier ................. B25B 11/007
248/362
4,561,686 A * 12/1985 Atchley ................ B66C 1/0231
294/188

(Continued)

FOREIGN PATENT DOCUMENTS

CN 105856185 A 8/2016
CN 111941462 A 11/2020
(Continued)

OTHER PUBLICATIONS

U.S. Appl. No. 16/178,040, titled "Variable Friction Cargo Surface System for Vehicles," filed Nov. 1, 2018 by GM Global Technology Operations LLC.
(Continued)

*Primary Examiner* — Stephen A Vu
(74) *Attorney, Agent, or Firm* — Lorenz & Kopf LLP

(57) ABSTRACT

Systems and methods are provided for shape controlled gripping of a workpiece. A layer jamming structure includes a membrane defining an internal cavity containing a number of overlapping material layers. A pressure system includes a pump coupled with the internal cavity. A shape conforming tool includes at least one part configured to move to apply a force to the layer jamming structure. The shape conforming tool, by operation of the part, conforms the layer jamming structure to the workpiece. The pressure system, with operation of the pump, changes a pressure in the internal cavity to impart rigidity to the layer jamming structure.

20 Claims, 6 Drawing Sheets

(51) Int. Cl.
*B25J 13/08* (2006.01)
*B25J 9/16* (2006.01)
*B25J 15/00* (2006.01)

(52) U.S. Cl.
CPC ........... *B25J 9/1633* (2013.01); *B25J 13/082* (2013.01); *B25J 15/0028* (2013.01)

(58) Field of Classification Search
CPC .... B25J 9/1633; B25J 13/082; B25J 15/0028; B25J 15/0023; B25J 15/0206; B25B 11/00
See application file for complete search history.

(56) References Cited

U.S. PATENT DOCUMENTS

| | | | |
|---|---|---|---|
| 6,846,029 B1 * | 1/2005 | Ragner | B25B 9/00 294/219 |
| 7,637,201 B2 | 12/2009 | Lin | |
| 8,087,845 B2 | 1/2012 | Lin et al. | |
| 8,548,626 B2 * | 10/2013 | Steltz | B25J 15/0023 294/213 |
| 8,702,340 B2 | 4/2014 | Lin et al. | |
| 8,882,165 B2 * | 11/2014 | Lipson | B25J 15/12 294/188 |
| 10,308,038 B2 * | 6/2019 | Hoover | B25J 15/0616 |
| 10,625,428 B2 | 4/2020 | Coleman et al. | |
| 2010/0078953 A1 | 4/2010 | Ban et al. | |
| 2015/0336227 A1 | 11/2015 | McKay et al. | |
| 2019/0106030 A1 | 4/2019 | Kim et al. | |
| 2019/0106916 A1 | 4/2019 | Sutherland et al. | |

FOREIGN PATENT DOCUMENTS

| | | |
|---|---|---|
| DE | 102011050099 A1 | 11/2012 |
| DE | 102018007563 A1 | 3/2019 |
| DE | 102020005752 A1 | 3/2021 |
| EP | 2796263 B1 | 11/2017 |

OTHER PUBLICATIONS

U.S. Appl. No. 16/564,777, titled "Pneumatic Articulating Structure System with Internal Tile Architecture," filed Sep. 6, 2019 by GM Global Technology Operations LLC.

U.S. Appl. No. 16/654,292, titled "Selectively Rigidizable Membrane," filed Oct. 16, 2019 by GM Global Technology Operations LLC.

Jaiswal et al., Vacuum Cup Grippers for Material Handling in Industry, International Journal of Innovative Science, Engineering & Technology, Jun. 2017, pp. 187-194, vol. 4 Issue 6.

Kim et al., A Novel Layer Jamming Mechanism with Tunable Stiffness Capability for Minimally Invasive Surgery, IEEE Transactions on Robotics, Aug. 2013, pp. 1031-1042, vol. 29, No. 4.

* cited by examiner

SHAPE CONTROL IN GRIPPING SYSTEMS AND METHODS

INTRODUCTION

The present disclosure generally relates to manufacturing tooling with shape control features, and more particularly relates to manufacturing systems and methods with conformable workpiece gripping where the device holding an object may include mechanical features to flexibly change the gripping geometry at initial contact with a workpiece, and which may then stiffen by layer jamming to constrain the workpiece.

Workpiece manipulation has generally been accomplished by manual activities which include an innate ability to control the adaptability to shapes and to control the force applied to objects. When mechanization takes the place of manual activities, the ability to control the adaptability to shape and to control the applied forces is subject to the inherent limitations imposed by the geometry and rigidity of mechanical structures. A mechanized gripper generally includes a pair of opposed, planar surfaces that compress an object for gripping, holding, lifting, and/or manipulation. However, the ability to control gripping may require more than just a compression function and therefore more sophisticated mechanisms are needed. For example, the shape of the objects being manipulated may be complex and may vary, requiring the ability to accommodate the complex shape and build variation that may exist. In addition, the increasing use of additive manufacturing processes has developed the ability to create components which have increasingly complex shapes. These shapes may not include flat or other surfaces that are conveniently contacted for gripping. Therefore, a need for more adaptable gripping mechanisms is intensifying.

Accordingly, the ability of a gripper/manipulator to conform to an individual workpiece's geometry and to grasp complex shapes is desirable. Furthermore, other desirable features and characteristics of the present invention will become apparent from the subsequent detailed description and the appended claims, taken in conjunction with the accompanying drawings and the foregoing technical field and background.

SUMMARY

Systems and methods with shape control features are provided for gripping workpieces. In a number of embodiments, a layer jamming structure includes a membrane defining an internal cavity containing a number of overlapping material layers. A pressure system includes a pump coupled with the internal cavity. A shape conforming tool includes at least one part that moves to apply a force to the layer jamming structure. The shape conforming tool, by operation of the moveable part, conforms the layer jamming structure to the workpiece. The pressure system, with operation of the pump, changes a pressure in the internal cavity to impart rigidity to the layer jamming structure.

In additional embodiments the shape conforming tool is a clamp with a first arm engaging the layer jamming structure and a second arm engaging the layer jamming structure. The shape conforming tool is formed in a C-shape with an open side sized to receive the workpiece.

In additional embodiments the first arm holds a first section of the layer jamming structure and the second arm holds a second section of the layer jamming structure. The first and second sections are held nonparallel relative to one another.

In additional embodiments, a controller operates the pressure system and operates an actuator of the shape conforming tool.

In additional embodiments, a sensor is coupled with the controller to monitor a parameter of the layer jamming structure.

In additional embodiments, the controller is coupled with the pump and with an actuator. The controller operates the actuator to preconform, by the shape conforming tool, the layer jamming structure to the workpiece prior to operating the pump to draw a vacuum in the internal cavity.

In additional embodiments, the sensor senses an applied force of the shape conforming tool. The controller operates the actuator to match the applied force to a predetermined force.

In additional embodiments, the workpiece includes a plurality of surfaces that are curved and/or oblique relative to each other, wherein the system is configured to grip the workpiece on the plurality of surfaces.

In additional embodiments, the shape conforming tool is a clamp formed in a shape that holds the layer jamming structure in a state configured to receive and envelop the workpiece.

In additional embodiments, the membrane is fixed to the clamp.

In a number of additional embodiments, a method includes forming a layer jamming structure including a membrane defining an internal cavity containing a number of overlapping material layers. A pressure system including a pump with the internal cavity is coupled with the internal cavity. A shape conforming tool is positioned to move to apply a force to the layer jamming structure. The shape conforming tool operates to conform the layer jamming structure to a shape of the workpiece. The pressure system operates the pump to change a pressure in the internal cavity to impart rigidity to the layer jamming structure.

In additional embodiments, the shape conforming tool is constructed as a clamp. The layer jamming structure is engaged by a first arm of the clamp and by a second arm of the clamp. The first and second arms conform the layer jamming structure into a shape to hold the workpiece.

In additional embodiments, the first arm holds a first section of the layer jamming structure and the second arm holds a second section of the layer jamming structure in a position where the first and second sections are nonparallel.

In additional embodiments, a controller operates the pressure system and an actuator to move the shape conforming tool and to impart the rigidity.

In additional embodiments, a sensor coupled with the controller monitors a parameter of the layer jamming structure.

In additional embodiments, an actuator operated by a controller preconforms the layer jamming structure to the workpiece. The controller, after preconforming the layer jamming structure, operates the pump to draw a vacuum in the internal cavity.

In additional embodiments, an applied force of the shape conforming tool is sensed. The controller operates the actuator to match the applied force to a predetermined force.

In additional embodiments, the workpiece is gripped at a plurality of surfaces that are curved and/or oblique relative to each other.

In additional embodiments, the shape conforming tool is formed as a clamp in a shape that holds the layer jamming structure in a state selected to receive and envelop the workpiece.

In a number of other embodiments, a gripping system for holding a workpiece includes a layer jamming structure that has a membrane defining an internal cavity containing a number of overlapping material layers. A pressure system includes a pump coupled with the internal cavity. A shape conforming tool includes a clamp formed in a shape that holds the layer jamming structure in a state configured to receive and envelop the workpiece. The shape conforming tool includes an actuator configured to move the shape conforming tool to apply a force to the layer jamming structure. The shape conforming tool is configured, with operation of the actuator, to conform the layer jamming structure to the workpiece. The pressure system is configured, with operation of the pump, to change a pressure in the internal cavity to impart rigidity to the layer jamming structure.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

In various embodiments, a layer jamming structure may generally include an airtight envelope containing internal thin layers of sheet-like material. Air pressure is employed to activate the thin layers of material to amplify the friction between each layer. In embodiments, vacuum is used and the higher the vacuum pressure (negative pressure), the larger the friction between adjacent layers. The frictional changes may be used to vary the stiffness of the gripper, such as between a compliant state and a rigid state, and may be used to contain and grip an object, such as for holding restraint and/or manipulation. In a number of embodiments, the layer jamming structure is combined with a mechanical clamp-like shape conforming tool to apply a determined force to impart a shape to the layer jamming structure for flexible workpiece holding. The ability to shape the layer jamming structure expands the scope of workpiece shapes that may be held and enables more secure gripping.

Figure 1:
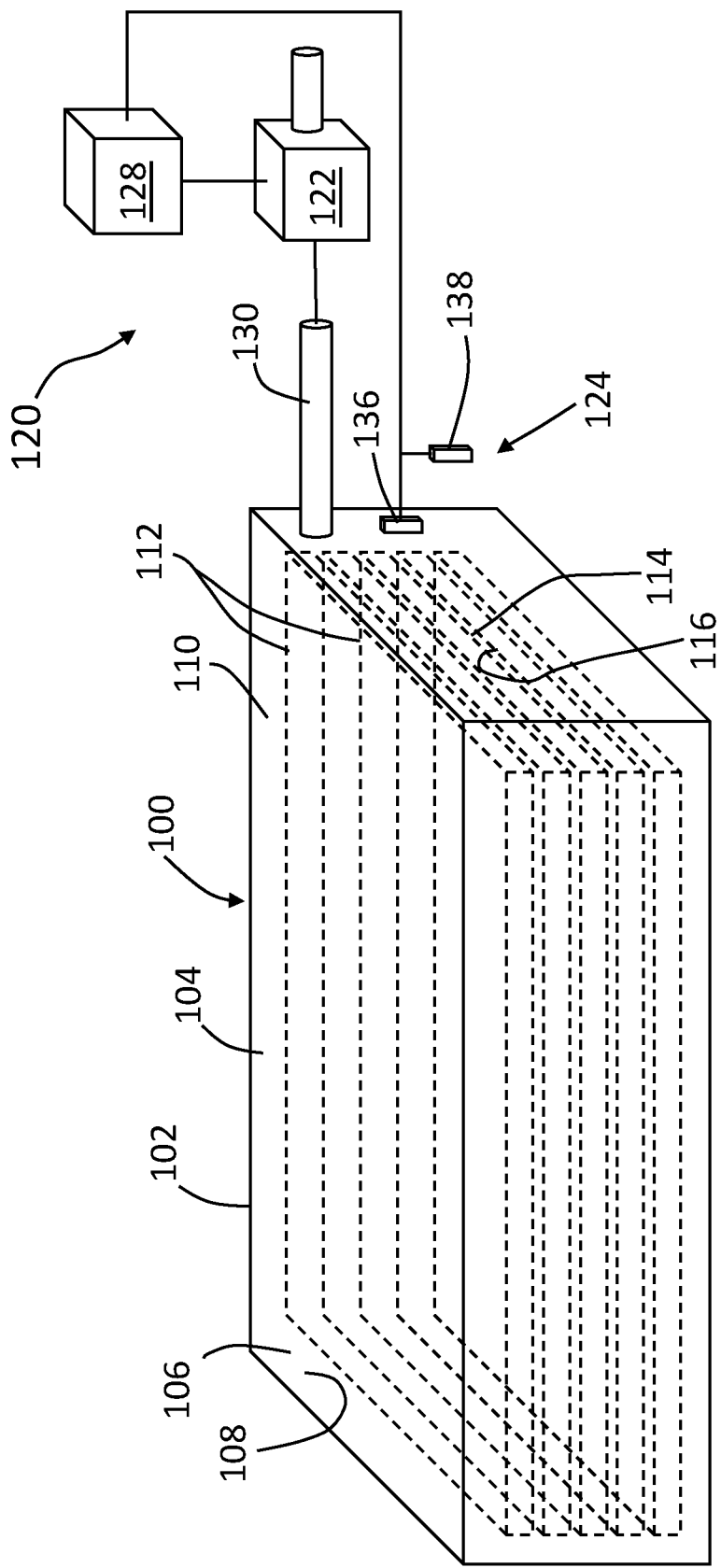
FIG. 1 is a schematic diagram of a layer jamming gripper and associated pressure system in a compliant state, in accordance with various embodiments.

Referring to FIG. 1 a layer jamming structure 100, which may be configured as a layer jamming gripper as described below, includes a membrane 102 that forms a wall 104 with an outer surface 106 and an inner surface 108 defining an enclosed internal cavity 110. The wall 104 may be made of one or multiple layers of a flexible material that, at least in some operational states, is compliant and deformable. In a number of embodiments, the material used for the wall 104 may include high friction properties at the outer surface 106 to facilitate gripping action relative to an object. For example, the membrane 102 may be constructed of an elastomer, such as natural or synthetic rubber.

Figure 2:
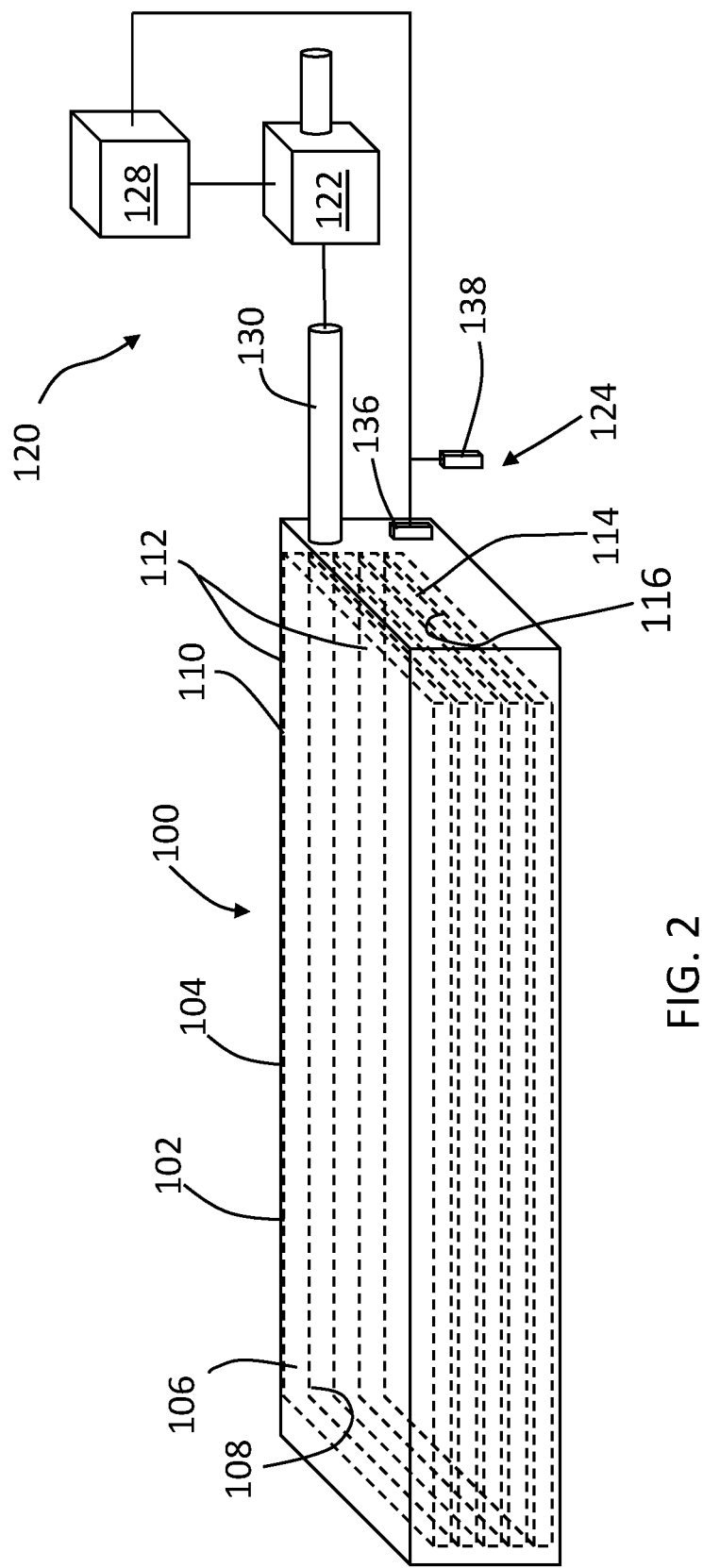
FIG. 2 is a schematic diagram of the layer jamming gripper and pressure system of FIG. 1 in an activated, rigid state, in accordance with various embodiments.

A number of overlapping material layers 112 are enclosed within the internal cavity 110. The material layers 112 may be made of sheet-like material created from a synthetic (plastic), woven or otherwise formed natural fibers, an elastomer, or other materials. Alternate layers may comprise different materials or the same material. The material layers 112 are disposed within the internal cavity 110 with complementary facing surfaces (such as surfaces 114, 116), of adjacent material layers 112 disposed in close or direct contact to be brought together under the application of a force such as from an applied jamming pressure. As illustrated in FIG. 1, the material layers 112 are separate pieces aligned with one another. In other embodiments, the material layers 112 may be offset or staggered relative to one another. In additional embodiments, the material layers 112 may be part of a larger sheet of material that is folded into layers. As illustrated in FIG. 1, the pressure inside the internal cavity 110, including at the inner surface 108 is equal to the pressure (atmospheric pressure) outside the internal cavity 110, including at the outer surface 106. In this inactivated state, the material layers 112 are able to move relative to one another with the surfaces 114, 116 slidable past one another and the layer jamming structure 100 is compliant. As illustrated in FIG. 2, the pressure inside the internal cavity 110, including at the inner surface 108 is different from the pressure (atmospheric pressure) outside the internal cavity 110, including at the outer surface 106. In this activated state, the material layers 112 exhibit high friction relative to one another with the surfaces 114, 116 being urged to remain static relative to one another. As a result, the layer jamming structure 100 may be transitioned between a flexible compliant state of FIG. 1 and a rigid state of FIG. 2.

In a number of embodiments, a method of controlling the applied jamming force of the layer jamming structure 100 includes operation of a pressure system 120. In general, the pressure system 120 includes a pump 122, a sensor suite 124, and a controller 128 coupled with each of the pump 122 and the sensor suite 124. The internal cavity 110 is in fluid communication with a conduit 130 through an opening in the wall 104 of the membrane 102. A fluid such as air may be introduced into or removed from the internal cavity 110 through the conduit 130 to increase or decrease pressure in the internal cavity 110. The pump 122 is connected in the conduit 130 to facilitate air movement therethrough. In a number of embodiments, a valved conduit (not shown), may be in fluid communication with the internal cavity. Such a valve may be opened, for example to efficiently relieve vacuum in the internal cavity 110 and may be closed, such as when a vacuum is drawn by the pump 122. The controller 128 controls operation of the pump 122 and the valve when included, in coordination.

The controller 128 is supplied with parameter data from the sensor suite 124. The sensor suite 124 may include sensor(s) 136 contained in the internal cavity 110, or extending through or embedded in the membrane 102. The sensor suite may include sensors 138 external to the membrane 102. The sensor suite 124 may be configured to monitor at least one parameter such as to determine air pressure, force, position/location, and/or other system parameters. The sensor suite 124 is coupled with a controller 128, which receives signals from the sensor suite 124 for making determinations related to the capture, gripping and manipulation of objects. In general, the controller 128 uses the available inputs, including those from the sensor suite 124, to provide a control system of the pressure system 120 and other systems to effectively govern various functions of the fixturing of an object such as a workpiece. The controller 128 generally includes a processor and a memory device, and may be coupled with a storage device. The processor performs the computation and control functions of the controller 128 according to programmed steps, algorithms, calculations, etc., and may comprise any type of processor or multiple processors. The controller 128 may be coupled with one or more actuator(s) 148 to effect various actions as described below.

To make the layer jamming structure 100 rigid, such as to effect gripping, air or another fluid may be evacuated from the internal cavity 110 creating a vacuum pressure condition within the internal cavity 110. The membrane 102 and the material layers 112 transition between a compliant state to a rigid state, by establishing a pressure differential across the wall 104 of the membrane 102 at the inner surface 108 and the outer surface 106. In FIG. 1, the pressure inside the membrane 102 in the internal cavity 110 is generally equal to the pressure outside of the membrane 102 and the layer jamming structure 100 is in a compliant state. For example, the pressure inside the membrane 102 may be the same, or approximately the same, as the pressure outside the membrane 102. In this compliant state, the overlapping material layers 112 readily move relative to one another (for example, by sliding or shearing past each other) and are relatively easily deformable in response to an applied force or load.

As illustrated in FIG. 2, pressure in the internal cavity 110 is different, and in this case less than the pressure outside of the membrane 102. This difference in pressure causes the membrane 102 to contract and causes the frictional resistance between the material layers 112 to increase as the overlapping material layers 112 are compressed together, creating a rigid state. In the current embodiment, the pressure inside the membrane 102 is significantly lower (such as by a factor of ten or more), than the pressure outside the membrane 102. The extent of rigidity is a factor of the extent to which adjacent material layers overlap, material layer 112 frictional properties, and the pressure difference between the internal cavity 110 and the environment outside the membrane 102. A high level of rigidity may be achieved, which locks the layer jamming structure 100 in a rigid state.

Figure 3:
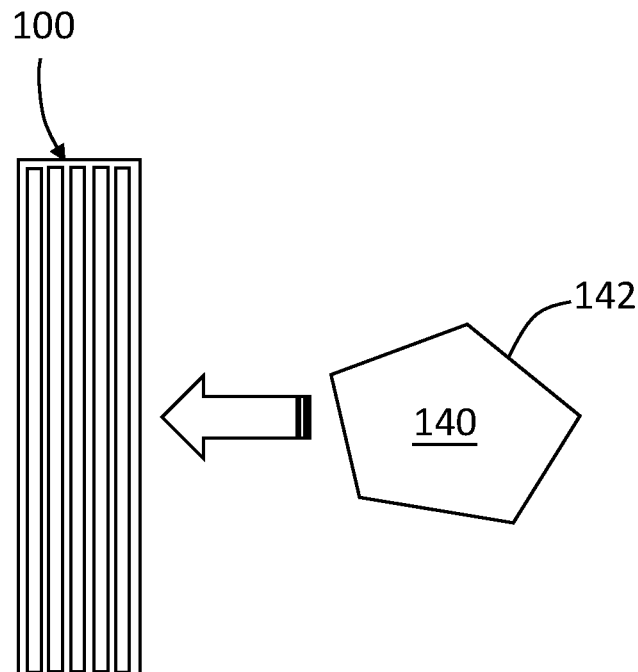
FIG. 3 is a schematic diagram of the layer jamming gripper of FIG. 1 in a compliant state and in the process of being introduced to a workpiece, in accordance with various embodiments.
Figure 4:
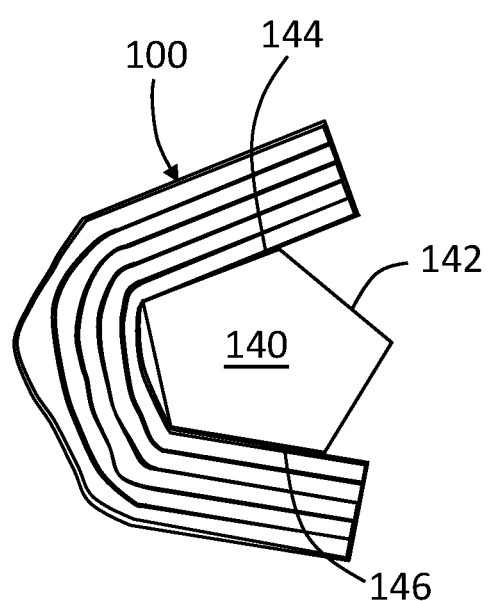
FIG. 4 is a schematic diagram of the layer jamming gripper of FIG. 3 in a rigid state and holding the workpiece of FIG. 3, in accordance with various embodiments.

Referring to FIG. 3, the layer jamming structure 100 is illustrated as preparing to receive an object in the form of a workpiece 140 in an application involving a use of the layer jamming structure 100 as a gripper to grasp and hold the workpiece 140. The workpiece 140 exhibits an irregular shape 142 defining a complex shape with no parallel opposite sides to clamp onto. In embodiments, the workpiece 140 may have no flat surfaces or features for conventional gripping technologies to engage. As shown in FIG. 4, the layer jamming structure is in receipt of the workpiece 140, and has conformed to its shape. For example, the irregular shape 142 includes a surface 144 and a surface 146 engaged by the layer jamming structure 100. The surfaces 144, 146 are one or more of curved and/or oblique relative to each other, and the system is configured to grip the workpiece 140 on those surfaces. Because the surfaces 144, 146 are closely enveloped and engaged by the layer jamming structure 100, the workpiece 140 is securely grasped and held. In a number of embodiments, the workpiece 140 may be an additive manufactured object and may be fixtured for post-printing operations, such as to remove supports needed for printing, or other operations. Securing the workpiece 140 by the layer jamming structure 100 ensures secure fixturing for the post-printing operations.

Figure 5:
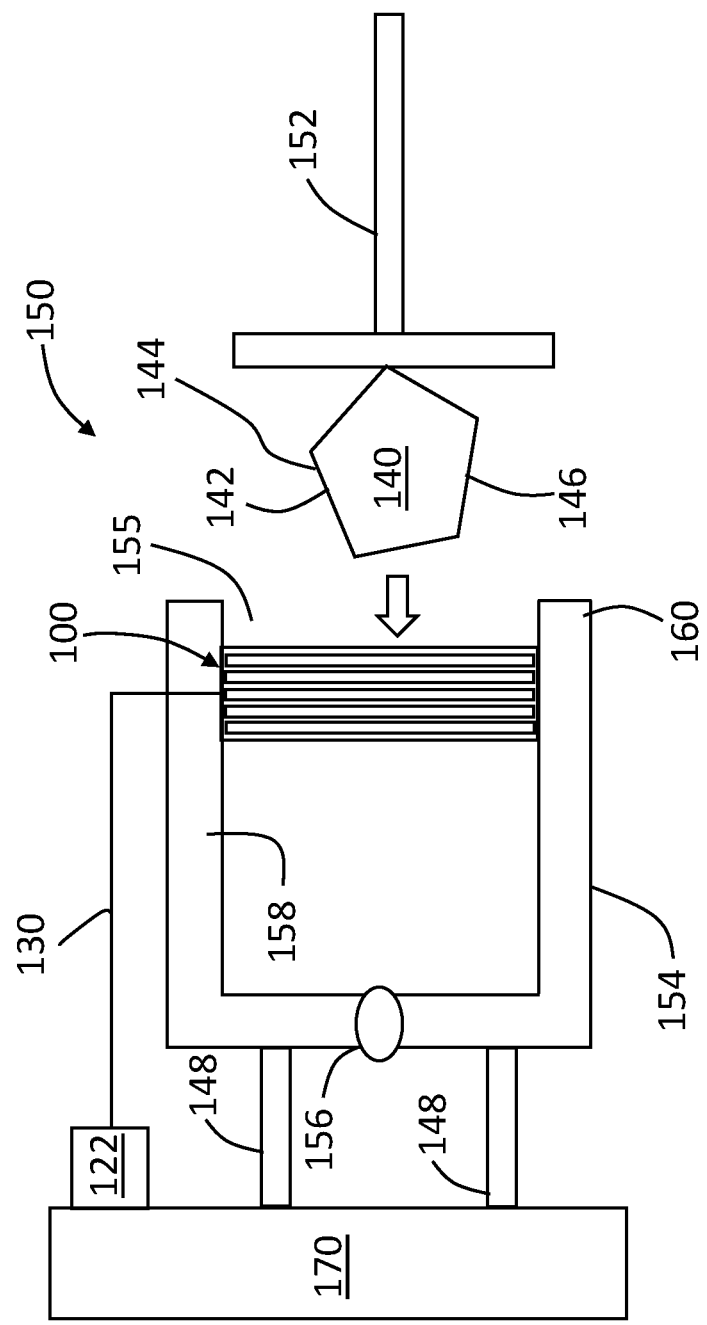
FIG. 5, is schematic diagram of the layer jamming gripper and pressure system of FIG. 1 mounted on a fixture and in the process of receiving a workpiece, in accordance with various embodiments.

As illustrated in FIG. 5, a gripping system 150 includes the layer jamming structure 100, the pressure system 120, an object director 152 and a shape conforming tool 154 embodied as a clamp. With the layer jamming structure 100 disposed in the shape conforming tool 154, the layer jamming structure 100 is sized and disposed to receive the workpiece 140. The object director 152 may be embodied as a ram that directs/pushes the workpiece 140 into the layer jamming structure 100. In other embodiments, the object director 152 may be a surface on which the workpiece 140 rests for capture by the gripping system 150. The shape conforming tool 154 is configured with at least one part that is moveable to preconform and enhance the shape of the layer jamming structure 100 to match the shape of the workpiece 140. In the current embodiment, the shape conforming tool 154 includes a hinge embodied as a pivot 156, an arm 158, an arm 160, and the at least one actuator 148, which in the current embodiment includes two actuators 148. The actuators 148 may be electric, fluid powered, or mechanical. The actuators 148 are coupled with the controller 128 for control of their operation and the actuators 148 move the arms 158, 160 to pivot or rotate relative to each other about the pivot 156. In other embodiments, the clamping action of the shape conforming tool 154 may be enhanced with a spring or springs. In other embodiments, the clamping movement may be releasably held in position such as by a ratchet mechanism. The shape conforming tool 154 is formed into a C-shape with an open side 155 sized to receive the workpiece 140. In a number of embodiments, the shape conforming tool 154 may take the form of an x-clamp, a cantilever clamp, a machining vice, a robotic end effector or another tool that applies force. The object director 152 presents and may push the workpiece 140 into the layer jamming structure 100 where it is within reach to be enveloped. The object director 152 may be coupled with the controller 128 and may be operated thereby. In an embodiment, rather than a mechanized actuator, human actuation of the shape conforming tool 154 may be employed.

Figure 6:
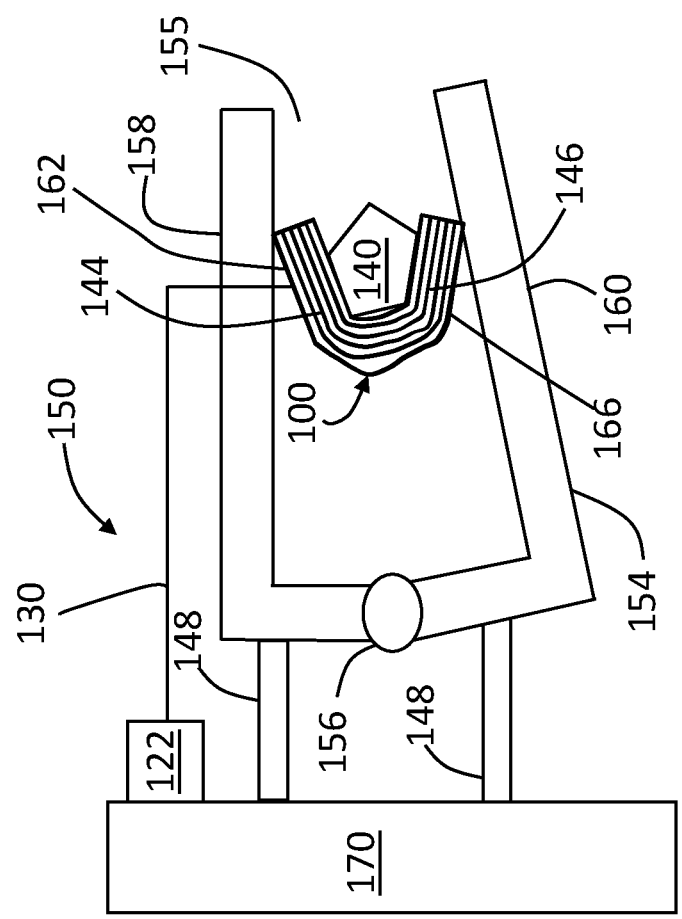
FIG. 6, is schematic diagram of the layer jamming gripper and pressure system of FIG. 5 in the process of conforming to the workpiece, in accordance with various embodiments.

With the workpiece 140 within the grasp range of the layer jamming structure 100, the controller operates the actuator(s) 148 moving the arms 158, 160 to preconform the layer jamming structure 100 to the shape of the workpiece 140 by operation of the shape conforming tool 154. As illustrated in FIG. 6 for example, the arm 158 applies force to the section 162 of the layer jamming structure 100, forcing the section 162 against the surface 144 of the workpiece 140. The action of the shape conforming tool 154 conforms the layer jamming structure 100 and specifically the section 162, to the shape of the surface 144. In addition, the shape conforming tool 154 and in particular the arm 160, applies force to, and conforms the section 166, to the shape of the surface 146. The conforming action includes forcing the layer jamming structure 100 around the workpiece 140 and guiding it through a shape change to securely envelope the workpiece 140. Following movement of the shape conforming tool 154 by the actuators 148, the layer jamming structure 100 is formed into a rough C-shape to hold the workpiece 140. The open side 155 of the C-shape of the shape conforming tool 154 is closed relative the position of FIG. 5. In the current embodiment, the surfaces 144, 146 are not parallel with one another and the preconforming action enhances the ability to securely grip the workpiece 140, such as for holding during a machining operation. The arms 158, 160 hold the sections 162, 166 in nonparallel positions relative to each other. The shape conforming tool 154 may apply a predetermined level of force, such as by matching the force level indicated by force sensors of the sensor suite 124. In an embodiment, the arm 158 is fixed to the section 162 and the arm 160 is fixed to the section 166 to secure the layer jamming structure 100 to the shape conforming tool 154. Fixing may be accomplished by an adhesive, a mechanical connection, or otherwise. The forces applied by the arms 158, 160 may increase the jamming rigidity of the sections 162, 166.

Figure 7:
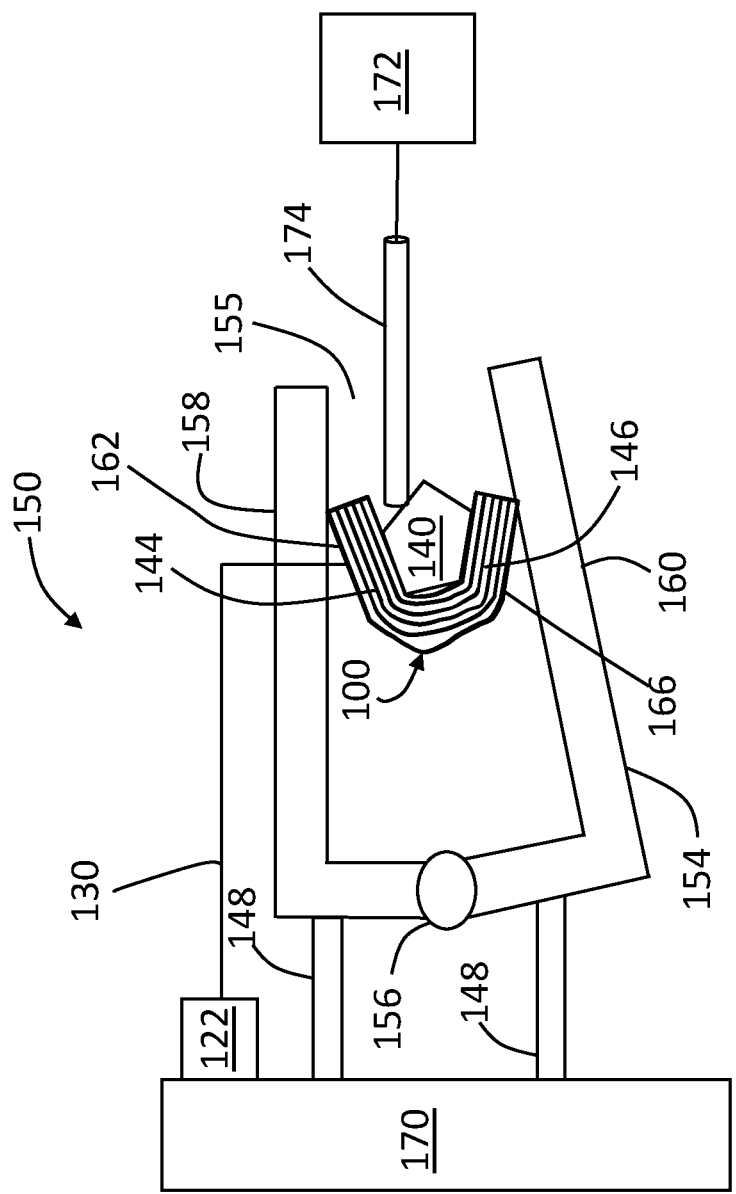
FIG. 7 is schematic diagram of the layer jamming gripper and pressure system of FIG. 5 in an activated, rigid state and gripping the workpiece, in accordance with various embodiments.

With the layer jamming structure 100 reshaped by the shape conforming tool 154, the pressure system 120 is operated by the controller 128. A vacuum is drawn within the internal cavity 110 and the material layers 112 are locked in place making the conformed layer jamming structure 100 rigid as shown in FIG. 7. A predetermined pressure differential may be applied to lock the layer jamming structure 100. In other embodiments, the sensor suite 124 may include pressure sensing and object vision and the controller 128 may adapt the pressure differential based on variations in the size, shape and/or orientation of the workpiece 140. In the current embodiment, the shape conforming tool 154 is securely connected with a fixture base 170, which for example, may be part of a machining tool to work the workpiece 140. In a number of embodiments, the workpiece 140 is formed by additive manufacturing and may have supports created as part of the printing process that require removal, such as by milling, grinding, cutting, or other machining. With the workpiece 140 securely held by the gripping system 150, a machine tool 172 with a cutter 174, which may be operated by the controller 128. The cutter 174 engages the workpiece 140 and performs material removal or reshaping. When necessary operations are complete, the pressure system 120 is operated to relieve the vacuum in the internal cavity 110, unlocking the layer jamming structure 100, the actuator(s) 148 are operated to release force from the shape conforming tool 154, and the workpiece 140 is released.

Through the embodiments disclosed herein, a gripping system 150 provides secure gripping and holding of workpieces that have complex/irregular shapes that may not include parallel flat surfaces for gripping. Initial shaping of a layer jamming structure is accomplished by the application of force by a clamp-like shape conforming tool and the layer jamming structure is then locked in a rigid state by creation of a vacuum.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes may be made in the function and arrangement of elements and/or steps without departing from the scope of the disclosure as set forth in the appended claims and the legal equivalents thereof.

What is claimed is:

1. A gripping system for holding a workpiece, the system comprising:
   a layer jamming structure including a membrane defining an internal cavity containing a number of overlapping material layers;
   a pressure system including a pump coupled with the internal cavity; and
   a shape conforming tool including at least one part configured to move to apply a force to the layer jamming structure,
   wherein the shape conforming tool comprises a clamp formed in a shape that holds the layer jamming structure in a state configured to receive and envelop the workpiece;
   wherein the shape conforming tool is configured, with operation of the at least one part, to conform the layer jamming structure to the workpiece,
   wherein the pressure system, with operation of the pump, is configured to change a pressure in the internal cavity to impart rigidity to the layer jamming structure.

2. The system of claim 1, wherein the clamp has a first arm engaging the layer jamming structure and a second arm engaging the layer jamming structure, wherein the shape conforming tool is formed in a C-shape with an open side sized to receive the workpiece.

3. The system of claim 2, wherein the first arm holds a first section of the layer jamming structure and the second arm holds a second section of the layer jamming structure, wherein the first and second sections are held nonparallel relative to one another.

4. The system of claim 1, comprising a controller configured to operate the pressure system and to operate an actuator of the shape conforming tool.

5. The system of claim 4, comprising at least one sensor coupled with the controller, the at least one sensor configured to monitor a parameter of the layer jamming structure.

6. The system of claim 1, comprising a controller coupled with the pump and with an actuator, wherein the controller is configured to operate the actuator to preconform, by the shape conforming tool, the layer jamming structure to the workpiece prior to operating the pump to draw a vacuum in the internal cavity.

7. The system of claim 6, comprising a sensor configured to sense an applied force of the shape conforming tool, wherein the controller is configured to operate the actuator to match the applied force to a predetermined force.

8. The system of claim 1, wherein the workpiece includes a plurality of surfaces that are at least one of curved and oblique relative to each other, wherein the system is configured to grip the workpiece on the plurality of surfaces.

9. The system of claim 1, wherein the layer jamming structure is initially shaped by the application of force by the shape conforming tool and the layer jamming structure is configured to then be locked in a rigid state by creation of a vacuum.

10. The system of claim 9, wherein the membrane is fixed to the clamp.

11. A method for holding a workpiece, the method comprising:
   forming a layer jamming structure including a membrane defining an internal cavity containing a number of overlapping material layers;
   coupling a pressure system including a pump with the internal cavity;
   positioning a shape conforming tool to move to apply a force to the layer jamming structure;
   operating the shape conforming tool to conform the layer jamming structure to a shape of the workpiece;
   operating, by a controller, the pressure system and an actuator to move the shape conforming tool and to impart the rigidity; and
   operating, by the pressure system, the pump to change a pressure in the internal cavity to impart rigidity to the layer jamming structure.

12. The method of claim 11, comprising:
   constructing the shape conforming tool as a clamp;
   engaging the layer jamming structure by a first arm of the clamp;
   engaging the layer jamming structure by a second arm of the clamp; and
   conforming, by the first and second arms, the layer jamming structure into a shape to hold the workpiece.

13. The method of claim 12, comprising:
   holding, by the first arm, a first section of the layer jamming structure; and
   holding, by the second arm, a second section of the layer jamming structure in a position where the first and second sections are nonparallel.

14. The method of claim 11, comprising operating, by the controller, the pressure system and the actuator that effects the overlapping material layers, the overlapping material layers having frictional properties, where a pressure difference between the internal cavity and the environment outside the membrane create a gripping action.

15. The method of claim 14, comprising monitoring, by at least one sensor coupled with the controller, a parameter of the layer jamming structure.

16. The method of claim 11, comprising:
   preconforming, by the actuator operated by the controller, the layer jamming structure to the workpiece; and
   operating, by the controller and after preconforming the layer jamming structure, the pump to draw a vacuum in the internal cavity.

17. The method of claim 16, comprising:
   sensing an applied force of the shape conforming tool; and
   operating, by the controller, the actuator to match the applied force to a predetermined force.

18. The method of claim 11, comprising gripping the workpiece at a plurality of surfaces that are at least one of curved and oblique relative to each other.

19. The method of claim 11, comprising:
   forming the shape conforming tool as a clamp; and
   forming the clamp in a shape that holds the layer jamming structure in a state selected to receive and envelop the workpiece.

20. A gripping system for holding a workpiece, the system comprising:
   a layer jamming structure including a membrane defining an internal cavity containing a number of overlapping material layers;
   a pressure system including a pump coupled with the internal cavity; and
   a shape conforming tool comprising a clamp formed in a shape that holds the layer jamming structure in a state configured to receive and envelop the workpiece, the shape conforming tool including an actuator configured to move the shape conforming tool to apply a force to the layer jamming structure,
   wherein the shape conforming tool is configured, with operation of the actuator, to conform the layer jamming structure to the workpiece,
   wherein the pressure system is configured, with operation of the pump, to change a pressure in the internal cavity to impart rigidity to the layer jamming structure.

* * * * *